(12) United States Patent
Ren et al.

(10) Patent No.: US 11,090,795 B2
(45) Date of Patent: Aug. 17, 2021

(54) HAND-HELD ELECTRIC POWER TOOL

(71) Applicant: Nanjing Chervon Industry Co., Ltd., Nanjing (CN)

(72) Inventors: Jie Ren, Nanjing (CN); Yuexiang Zhang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 454 days.

(21) Appl. No.: 16/224,274

(22) Filed: Dec. 18, 2018

(65) Prior Publication Data
US 2019/0210207 A1    Jul. 11, 2019

(30) Foreign Application Priority Data

Jan. 8, 2018   (CN) .......................... 201810016440.4
Jan. 8, 2018   (CN) .......................... 201820031997.0

(51) Int. Cl.
| | |
|---|---|
| *H02K 7/14* | (2006.01) |
| *B25F 5/00* | (2006.01) |
| *B25F 5/02* | (2006.01) |
| *H01M 50/20* | (2021.01) |
| *H02K 11/00* | (2016.01) |
| *B25B 21/02* | (2006.01) |
| *B25D 16/00* | (2006.01) |

(52) U.S. Cl.
CPC .............. *B25F 5/02* (2013.01); *H01M 50/20* (2021.01); *H02K 7/145* (2013.01); *H02K 11/0094* (2013.01); *B25B 21/02* (2013.01); *B25D 16/00* (2013.01); *B25D 2250/051* (2013.01); *B25D 2250/121* (2013.01); *H01M 2220/30* (2013.01)

(58) Field of Classification Search
CPC ...... H02K 7/145; H02K 7/14; H02K 11/0094; H02K 5/24; B25F 5/0006; B25F 5/00; B25F 5/02; B25D 16/00; B25D 2250/051; B25D 2250/121; B25B 21/02; H01M 2/10; H01M 2/1016; H01M 2/1022; H01M 2220/30; H01M 50/20
USPC ................................ 310/47, 50, 51; 320/112
See application file for complete search history.

(56) References Cited

U.S. PATENT DOCUMENTS

| 2005/0130034 A1* | 6/2005 | Buck ..................... H01M 50/20 429/160 |
| 2008/0248376 A1* | 10/2008 | Rejman ................. H01M 50/20 429/97 |
| 2009/0011325 A1* | 1/2009 | Agehara ............... H01M 50/20 429/98 |

(Continued)

*Primary Examiner* — Quyen P Leung
*Assistant Examiner* — Alexander Moraza
(74) *Attorney, Agent, or Firm* — Greenberg Traurig, LLP (57) ABSTRACT

A hand-held electric power tool includes a housing, a connecting seat, and an elastic member. The connecting seat is configured to couple a battery pack to the hand-held electric power tool along a first straight line whereby the battery pack and the hand-held electric power tool are electrically connected via the connecting seat. The connecting seat is operative to move along the first straight line and along a second straight line perpendicular to the first straight line. The elastic member is configured to movably connect the connecting seat to the housing, and is configured to generate a force at least along a third straight line inclined from the first straight line enabling the connecting seat and the battery pack to contact each other.

20 Claims, 6 Drawing Sheets

(56) References Cited

U.S. PATENT DOCUMENTS

2013/0308253 A1* 11/2013 Ogura ................... H01M 50/20
361/679.01

* cited by examiner

HAND-HELD ELECTRIC POWER TOOL

RELATED APPLICATION INFORMATION

This application claims the benefit under 35 U.S.C. § 119(a) of Chinese Patent Application No. CN 201810016440.4, filed on Jan. 8, 2018, the disclosure of which is incorporated herein by reference in its entirety.

TECHNICAL FIELD

The present disclosure relates generally to power tools, and more particularly relates to a hand-held electric power tool.

BACKGROUND

Electric power tools, especially hand-held, direct-current, electric, power tools (e.g., percussion drills, impact wrenches, and the like) are typically powered by a battery pack connected to a connecting seat of the electric power tool host. However, under poor working conditions (such as a large vibration amplitude, high vibration frequency of the electric power tool, etc.), a bad contact is prone to occur between the electric power tool and battery pack, and severe wear of a connecting piece and connection terminals can also happen. This will adversely affect the user experience and shorten the product's life expectancy.

In view of the above problems, the typically solution currently used is as follows: a protrusion is provided on the connecting seat along a first straight line of the battery pack, and a groove is correspondingly defined in the battery pack. The protrusion is inserted into the groove causing a free end of the protrusion to abut against a bottom surface of the groove to limit the movement of the connecting seat in the orientation perpendicular to the first straight line. Although this method reduces the wear to a certain extent, a bad contact may still occur under vibrating working conditions because the groove and the protrusion cannot be seamlessly fitted with each other in a practical sense. According to some other methods, a floating connecting seat is used to allow the connecting seat to move along the first straight line thereby solving the terminals' wear problem; however, the connecting seat still cannot move in the orientation perpendicular to the first straight line, bringing no significant alleviation of the bad contact situation.

SUMMARY

The present disclosure provides a hand-held, electric, power tool, which includes a housing, a connecting seat, and an elastic member. The connecting seat is configured to couple a battery pack to the hand-held electric power tool along a first straight line whereby the battery pack and the hand-held electric power tool are electrically connected via the connecting seat. The connecting seat is operative to move along the first straight line and along a second straight line perpendicular to the first straight line. The elastic member is configured to movably connect the connecting seat to the housing, and configured to generate a force at least along a third straight line inclined with respect to the first straight line enabling the connecting seat and the battery pack to contact each other.

In one example, the connecting seat is provided with a protrusion configured to fit a groove in the battery pack and extending along the first straight line.

In one example, the connecting seat is provided with a groove configured to fit a protrusion on the battery pack and extending along the first straight line.

In one example, the housing is provided with a limiting groove and the connecting seat is arranged in the limiting groove and is operative to move within a space restricted by the limiting groove.

In one example, the elastic member is a spring.

In one example, a mounting column is disposed on an outer wall of the connecting seat or on the housing, the mounting column extends along a direction inclined with respect to the first straight line, and the spring is sleeved around the mounting column.

In one example, the elastic member is arranged to be inclined from the first straight line.

Also described is an electric, power tool which includes a housing, a connecting seat, and an elastic member. The connecting seat is configured to couple a battery pack to the electric power tool along a first straight line whereby the battery pack and the electric power tool are electrically connected via the connecting seat. The connecting seat is operative to move along the first straight line and along a second straight line perpendicular to the first straight line. The elastic member is configured to movably connect the connecting seat to the housing and is configured to generate a force at least along a third straight line inclined from the first straight line enabling the connecting seat and the battery pack to contact each other.

In one example, the connecting seat is provided with a protrusion configured to fit a groove in the battery pack and extending along the first straight line.

In one example, the housing is provided with a limiting groove and the connecting seat is arranged in the limiting groove and is operative to move within a space restricted by the limiting groove.

In one example, the elastic member is a spring.

In one example, a mounting column is disposed on an outer wall of the connecting seat or on the housing, the mounting column extends along a direction inclined from the first straight line, and the spring is sleeved around the mounting column.

In one example, the elastic member is arranged to be inclined from the first straight line.

Still further is described an electric, power tool assembly, which includes an electric power tool and a battery pack configured to supply electricity to the electric power tool. The electric power tool includes a housing, a connecting seat, and an elastic member. The connecting seat is configured to couple the battery pack to the electric power tool along a first straight line whereby the battery pack and the electric power tool are electrically connected via the connecting seat. The connecting seat is operative to move along the first straight line and along a second straight line perpendicular to the first straight line. The elastic member is configured to movably connect the connecting seat to the housing, and is configured to generate a force at least along a third straight line inclined with respect to the first straight line enabling the connecting seat and the battery pack to contact each other.

In one example, the housing is provided with a limiting groove, and the connecting seat is arranged in the limiting groove and is operative to move within a space restricted by the limiting groove.

In one example, the connecting seat is provided with a protrusion configured to fit a groove in the battery pack and extending along the first straight line.

In one example, the elastic member is a spring.

In one example, a mounting column is disposed on an outer wall of the connecting seat or on the housing, the mounting column extends along a direction inclined relative to the first straight line of the battery pack, and the spring is sleeved around the mounting column.

In one example, the elastic member is arranged to be inclined from the first straight line.

In one example, the electric power tool assembly further includes a locking mechanism for locking the battery pack to the electric power tool.

According to the present disclosure, the connecting seat of the hand-held, electric, power tool is movably coupled to the housing by an elastic member arranged to be inclined from the first straight line of the battery pack. Thus, when the hand-held, electric, power tool, is operated under severe working conditions such as a large amplitude of vibration, the elastic member can enable the connecting seat to move along both the first straight line and the second straight line. Thereby, the connecting piece of the connecting seat is always in good contact with the terminals of the battery pack, ensuring that the hand-held, power tool will work properly on a consistent basis and avoiding the wear of the terminals and the connecting piece caused by severe vibration of the hand-held power tool. As a result, the service life of both the hand-held, electric, power tools and the battery packs are lengthened.

DETAILED DESCRIPTION OF ILLUSTRATIVE EMBODIMENTS

The technical solutions achieved in accordance with the present disclosure will now be described in further detail below in conjunction with the drawings and specific embodiments.

Figure 1:
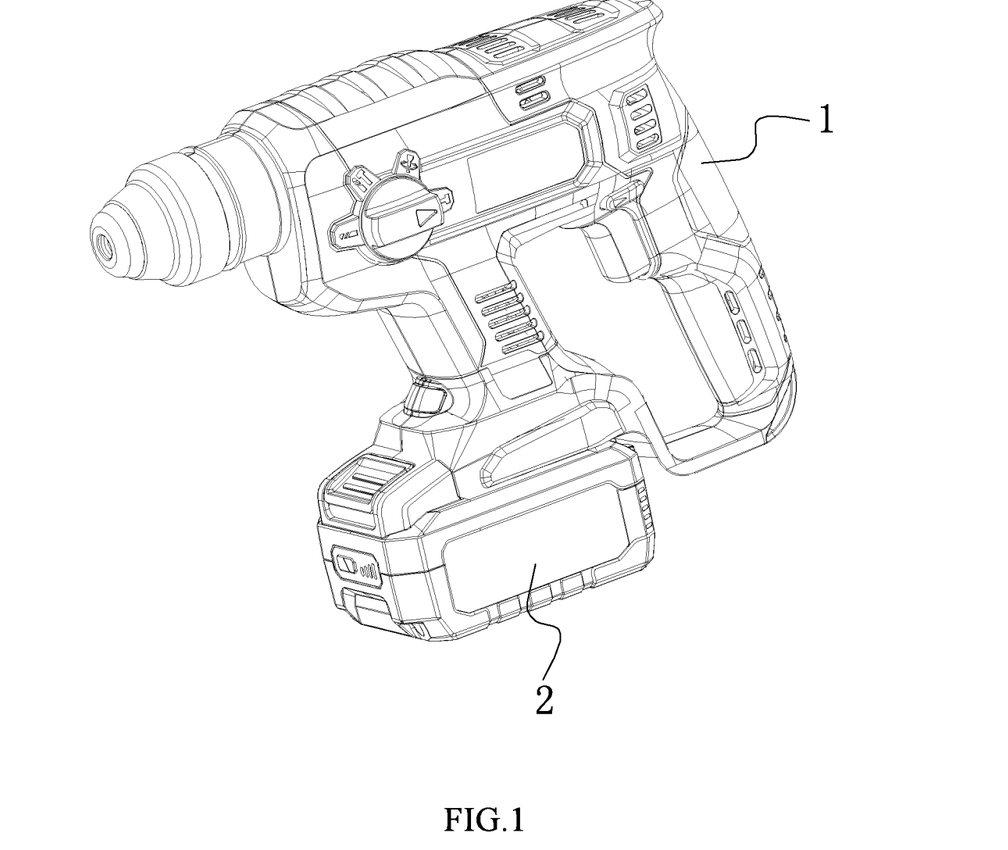
FIG. 1 is a schematic diagram of an example electric, power tool assembly constructed according to the description which follows.

An example electric, power tool system is shown in FIG. 1. The electric, power tool system includes a hand-held, electric, power tool 1 and a power source. The hand-held, electric, power tool 1 is shown in FIG. 1 by way of example only and is not intended to be limiting. Accordingly, the teachings set forth herein can be used in connection with other power tools, particularly with percussive, power tools with large vibration amplitude and vibration frequency, such as a percussion drill and an impact wrench. The power supply is preferred but not limited to a battery pack 2. The battery pack 2 is locked on the hand-held, electric, power tool 1 through a locking mechanism.

Figure 2:
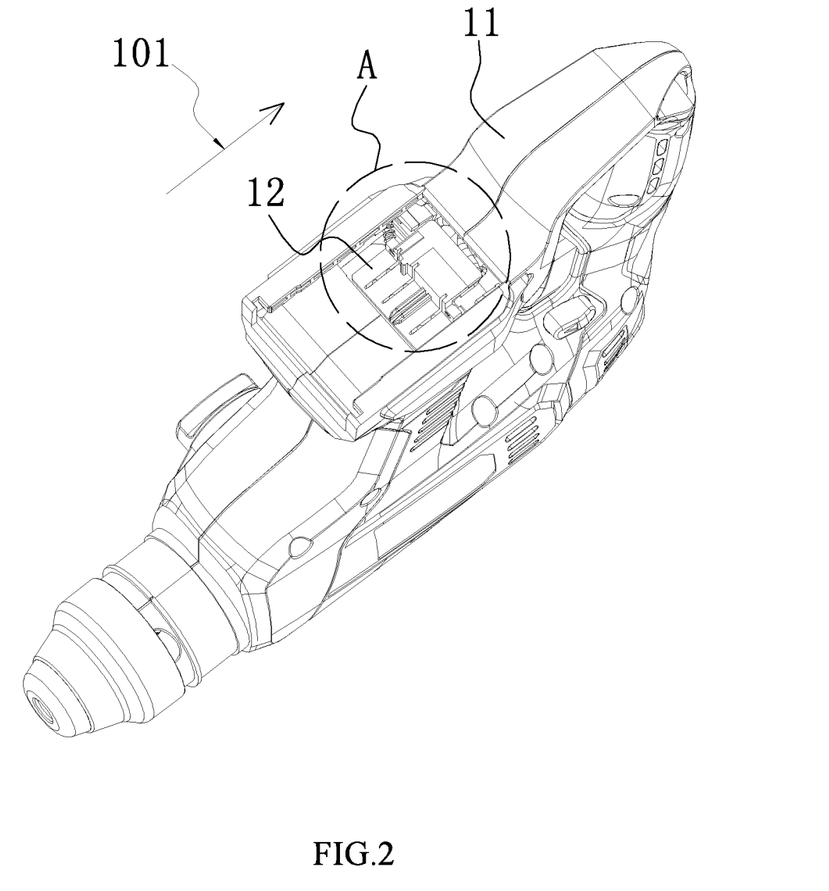
FIG. 2 is also a schematic diagram of an example electric, power tool constructed according to the description which follows.
Figure 3:
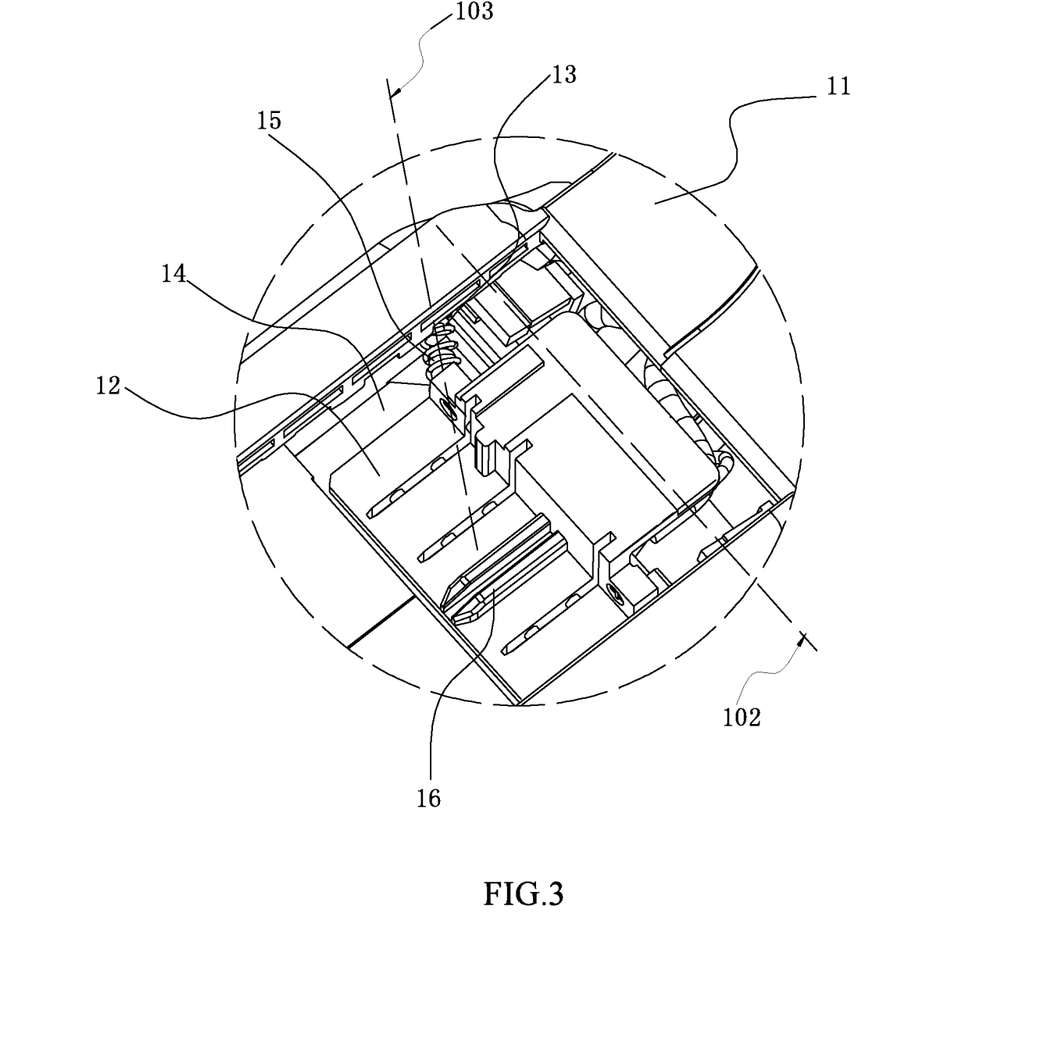
FIG. 3 is a partial enlargement view of portion A shown in FIG. 2.

As shown in FIG. 2 and FIG. 3, the hand-held, electric, power tool 1 is a percussion drill, and the hand-held, electric, power tool 1 includes a housing 11, a connecting seat 12 and an elastic member 13. The connecting seat 12 is movably connected to the housing 11 via the elastic element 13. The connecting seat 12 is configured to receive the battery pack 2 and electronically connect the battery pack 2 to the hand-held, electric, power tool 1. The direction in which the battery pack 2 is coupled to the hand-held, electric, power tool 1 is defined as a first straight line 101. That is, the connecting seat 12 is capable of coupling the battery pack 2 along the first straight line 101 to the hand-held, electric, power tool 1. The elastic member 13 generates a force, at least along a third straight line 103 inclined with respect to the first straight line 101, enabling the connecting seat 12 and the battery pack 2 to contact each other. In one or more embodiments, the elastic member 13 is disposed along the third straight line 103 which is inclined from the first straight line 101. The first straight line 101 refers to the direction in which the connecting structure on the hand-held electric power tool 1 extends. When the battery pack 2 is not inserted or the battery pack 2 is inserted but the hand-held electric power tool 1 is not in operation, and the connecting structure is configured to electrically connect to the terminals of the battery pack 2, which are preferably a connecting piece. This arrangement is such that the connecting seat 12 is capable of simultaneously moving along both the first straight line 101 and the second straight line 102 perpendicular to the first straight line 101 of the battery pack 2, thereby solving the problems of poor contact and wear between the battery pack 2 and the connecting seat 12. The elastic member 13 may be, but is not limited to, a spring, and particularly a spiral spring. After the battery pack 2 is locked onto the housing 11 of the hand-held electric power tool 1, the elastic member 13 is the example provided is always in a compressed state.

Because the elastic member 13 is disposed to be inclined from the first straight line 101, the elastic member 13 would be capable of providing an elastic force to enable the connecting seat 12 to move along both the first straight line 101 and the second straight line 102 perpendicular to the first straight line 101 when the hand-held electric power tool 1 is operated under severe working conditions such as a large amplitude of vibration. The connecting piece of the connecting seat 12 and the terminals of the battery pack 2 are thus always in good contact and the wear between the terminals and the connecting piece can also be avoided.

As shown in FIG. 3 to FIG. 6, a limiting groove 14 is defined in the housing 11, and the connecting seat 12 is received in the limiting groove 14 and is capable of moving within a space limited by the limiting groove 14. The limiting groove 14 makes the overall structure more compact. The size of the limiting groove 14 is specifically chosen according to the vibration condition of the hand-held, electric, power tool 1. In order to facilitate positioning and mounting of the spring, a mounting column 15 can be disposed on the outer wall of the connecting seat 12. The mounting column 15 extends along a direction inclined from the first straight line 101, and extend along the third straight line 103, while the spring is sleeved around the mounting column 15. It can be understood that the third straight line 103 along which the mounting column 15 extends is the same as the direction in which the spring is inclined in its initial state when the hand-held, electric, power tool 1 is not mounted with the battery pack 2. It will be appreciated that in other embodiments, the mounting column 15 may also be provided also or only on the inner wall of the housing 11.

Figure 4:
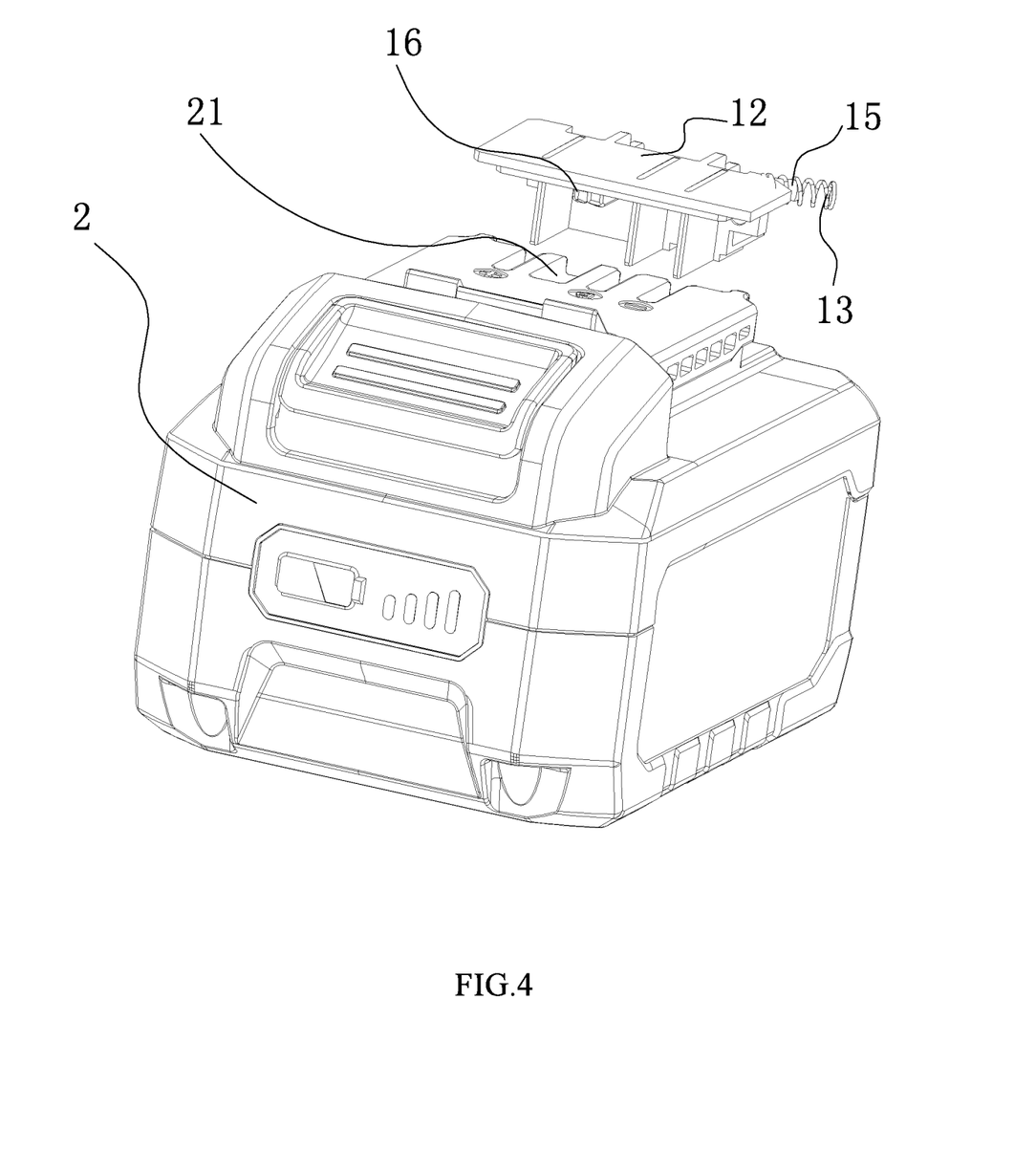
FIG. 4 is a schematic diagram illustrating the battery pack and the connecting seat before they are connected according to an example described herein.
Figure 5:
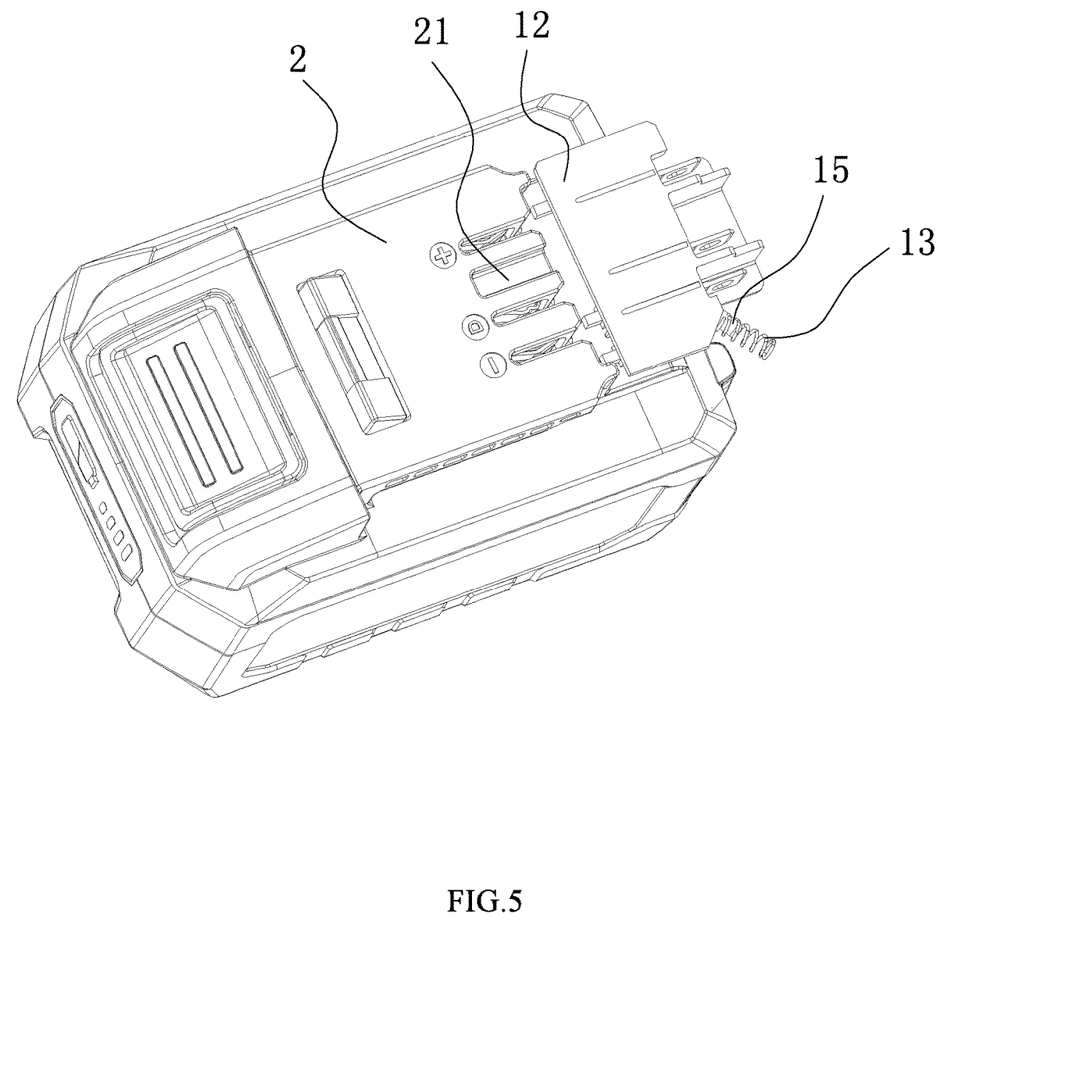
FIG. 5 is another schematic diagram illustrating the battery pack and the connecting seat connected according to an example described herein.
Figure 6:
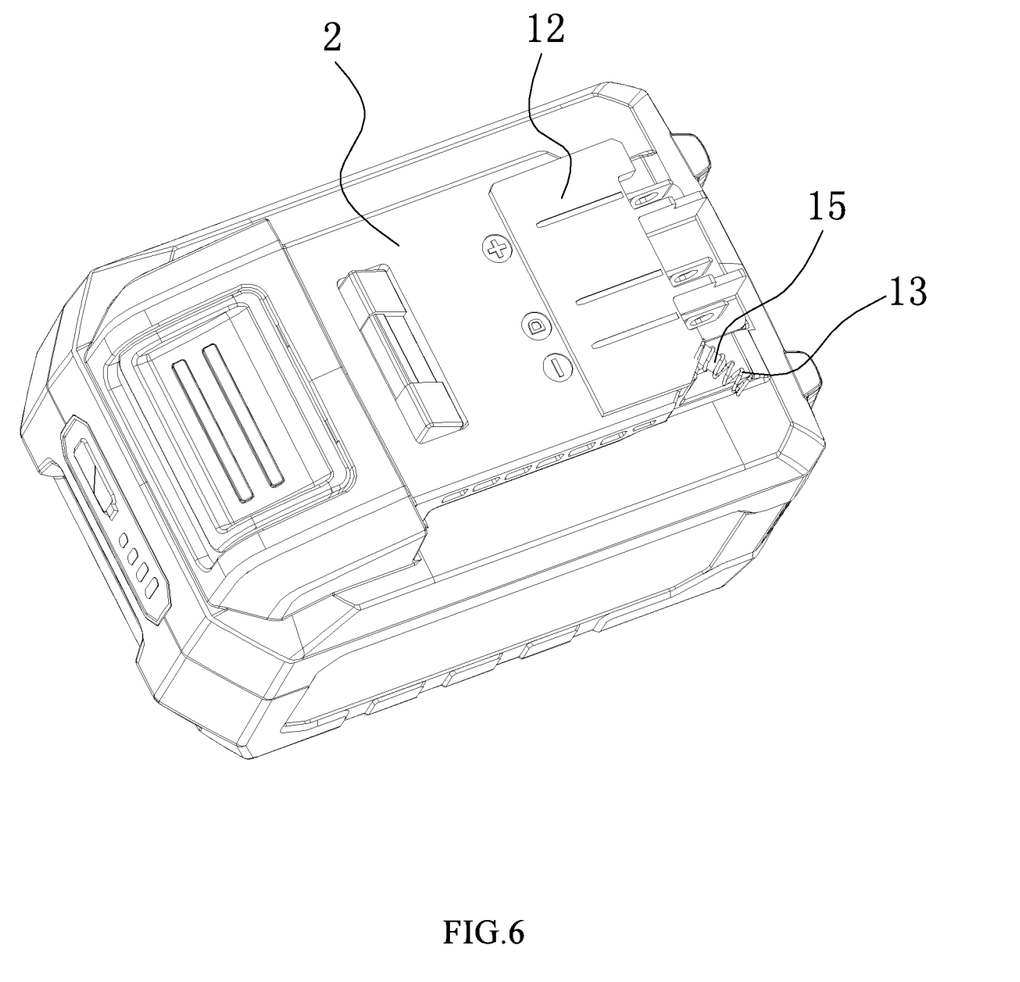
FIG. 6 is a schematic diagram illustrating the battery pack and the connecting seat after they are connected according to an example described herein.

FIG. 4 and FIG. 5 are schematic diagrams illustrating the battery pack 2 and connecting seat 12 before they are connected. FIG. 6 is a schematic diagram illustrating the battery pack 2 and connecting seat 12 after they are connected. In order to further facilitate the close contact between the connecting seat 12 and the terminals of the battery pack 2, the connecting seat 12 can be provided with a protrusion 16 extending along the first straight line 101 of the battery pack 2. The battery pack 2 can be provided with a groove 21 to fit the protrusion 16 and extending along the first straight line 101. In FIG. 6, the protrusion 16 has been inserted into the groove 21, and the protrusion 16 and the groove 21 are blocked by the connecting seat 12 from being visible. The groove 21 is recessed inwardly from the top of a housing of the battery pack 2 and penetrates to the free end of the housing of the battery pack 2. The outer contour of the protrusion 16 typically matches the inner contour of the groove 21, and the elastic force of the spring enables the protrusion 16 and the groove 21 to be in close contact, thereby ensuring the close contact between the connecting piece of the connecting seat 12 and the terminals of the battery pack 2. The protrusion 16 and the groove 21 can also serve as a guide for facilitating the installation of the battery pack 2.

It should be noted that, in other embodiments, the groove may be defined also or only on the connecting seat 12 along the first straight line 101 of the battery pack 2, and the protrusion may be disposed on the battery pack 2 to fit the groove in the connecting seat 12. The groove in the connecting seat 12 is arranged with reference to the groove 21 on the battery pack 2.

The working principle of the hand-held, electric, power tool 1 and the electric, power tool assembly provided by the embodiments is briefly described below.

The battery pack 2 is electrically connected to the connecting seat 12 and is locked onto the housing 11 of the hand-held, electric, power tool 1, and the elastic member 13 is pressed to provide the connecting seat 12 with an elastic force inclined from the first straight line 101 of the battery pack 2. When the hand-held, electric, power tool 1 is operated under severe conditions such as a large amplitude of vibration, the elastic force can enable the connecting seat 12 to move along both the first straight line 101 of the battery pack 2 and the second straight line perpendicular to the first straight line 101 of the battery pack 2. The connecting piece of the connecting seat 12 and the terminals of the battery pack 2 are thus always in good contact with each other. Thus, the hand-held, electric, power tool 1 can work properly with consistency, and the hand-held electric power tool 1 can be prevented from being severely vibrated. The problem of wear of the terminals and the connecting piece is thus solved. As a result, the service life of both the electric power tool and the battery pack 2 will be lengthened.

The technical principles of the present disclosure have been described above in connection with specific examples. The foregoing description is intended for the sole purpose of explaining the principles of the present disclosure and is not to be construed as limiting the scope of the present disclosure. Based on the disclosure herein, those skilled in the art can devise various other embodiments in accordance with the present disclosure without departing from the scope of the present disclosure.

What is claimed is:

1. A hand-held, electric, power tool, comprising:
    a housing;
    a connecting seat configured to couple a battery pack to the hand-held, electric, power tool along a first straight line whereby the battery pack and the hand-held, electric, power tool are electrically connected via the connecting seat, wherein the connecting seat is operative to move along the first straight line and along a second straight line perpendicular to the first straight line; and
    an elastic member configured to movably connect the connecting seat to the housing and configured to generate a force at least along a third straight line inclined with respect to the first straight line enabling the connecting seat and the battery pack to contact each other.

2. The hand-held, electric, power tool according to claim 1, wherein the connecting seat is provided with a protrusion configured to fit a groove in the battery pack and extending along the first straight line.

3. The hand-held, electric, power tool according to claim 1, wherein the connecting seat is provided with a groove configured to fit a protrusion on the battery pack and extending along the first straight line.

4. The hand-held, electric, power tool according to claim 1, wherein the housing is provided with a limiting groove and the connecting seat is arranged in the limiting groove and is operative to move in a space restricted by the limiting groove.

5. The hand-held, electric, power tool according to claim 1, wherein the elastic member is a spring.

6. The hand-held, electric, power tool according to claim 5, wherein a mounting column is disposed on an outer wall of the connecting seat or on the housing, the mounting column extends along a direction inclined with respect to the first straight line, and the spring is sleeved around the mounting column.

7. The hand-held, electric, power tool according to claim 1, wherein the elastic member is arranged to be inclined from the first straight line.

8. An electric, power tool, comprising:
    a housing;
    a connecting seat configured to couple a battery pack to the electric, power tool along a first straight line whereby the battery pack and the electric, power tool are electrically connected via the connecting seat, wherein the connecting seat is operative to move along the first straight line and along a second straight line perpendicular to the first straight line; and
    an elastic member configured to movably connect the connecting seat to the housing, and configured to generate a force at least along a third straight line inclined from the first straight line enabling the connecting seat and the battery pack to contact each other.

9. The electric, power tool according to claim 8, wherein the connecting seat is provided with a protrusion configured to fit a groove in the battery pack and extending along the first straight line.

10. The electric, power tool according to claim 8, wherein the housing is provided with a limiting groove and the connecting seat is arranged in the limiting groove and is operative to move in a space restricted by the limiting groove.

11. The electric, power tool according to claim 8, wherein the elastic member is a spring.

12. The electric, power tool according to claim 11, wherein a mounting column is disposed on an outer wall of the connecting seat or on the housing, the mounting column extends along a direction inclined from the first straight line, and the spring is sleeved around the mounting column.

13. The electric, power tool according to claim 8, wherein the elastic member is arranged to be inclined from the first straight line.

14. An electric, power tool assembly, comprising:
an electric, power tool; and
a battery pack configured to supply electricity to the electric, power tool;
wherein the electric, power tool comprises:
a housing;
a connecting seat configured to couple the battery pack to the electric, power tool along a first straight line whereby the battery pack and the electric, power tool are electrically connected via the connecting seat, wherein the connecting seat is operative to move along the first straight line and along a second straight line perpendicular to the first straight line; and
an elastic member configured to movably connect the connecting seat to the housing, and configured to generate a force at least along a third straight line inclined with respect to the first straight line enabling the connecting seat and the battery pack to contact each other.

15. The electric, power tool assembly according to claim 14, wherein the housing is provided with a limiting groove and the connecting seat is arranged in the limiting groove and is operative to move within a space restricted by the limiting groove.

16. The electric, power tool assembly according to claim 14, wherein the connecting seat is provided with a protrusion configured to fit a groove in the battery pack and extending along the first straight line.

17. The electric, power tool assembly according to claim 14, wherein the elastic member is a spring.

18. The electric, power tool assembly according to claim 17, wherein a mounting column is disposed on an outer wall of the connecting seat or on the housing, the mounting column extends along a direction inclined from the first straight line of the battery pack, and the spring is sleeved around the mounting column.

19. The electric, power tool assembly according to claim 14, wherein the elastic member is arranged to be inclined from the first straight line.

20. The electric, power tool assembly according to claim 14, further comprising a locking mechanism for locking the battery pack to the electric power tool.

* * * * *